(No Model.) 9 Sheets—Sheet 5.
A. C. NORTH.
STRINGING MACHINE.
No. 489,982. Patented Jan. 17, 1893.
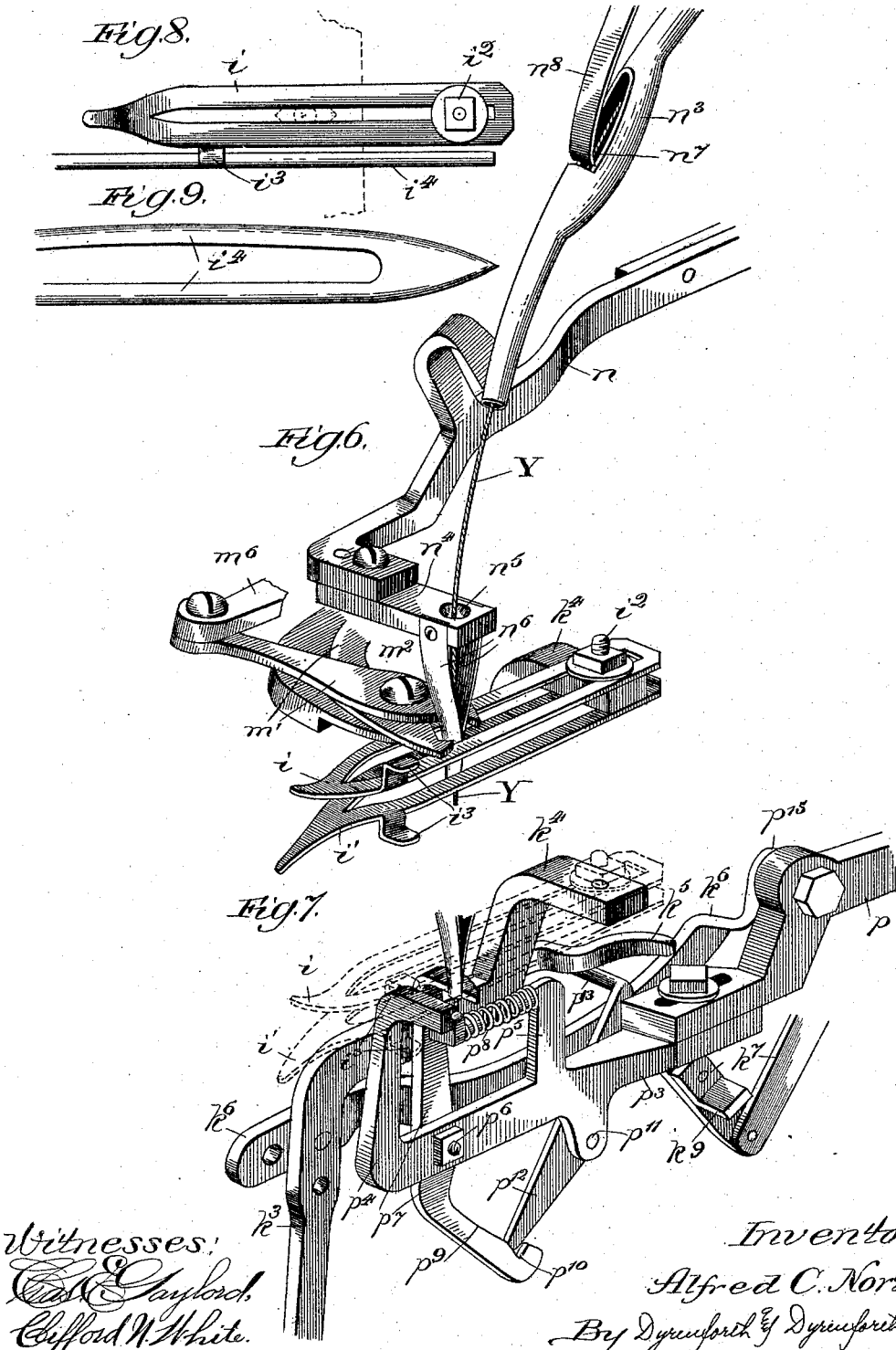
Witnesses:
Chas. E. Gaylord,
Clifford N. White.
Inventor:
Alfred C. North,
By Dyrenforth & Dyrenforth
Attys.

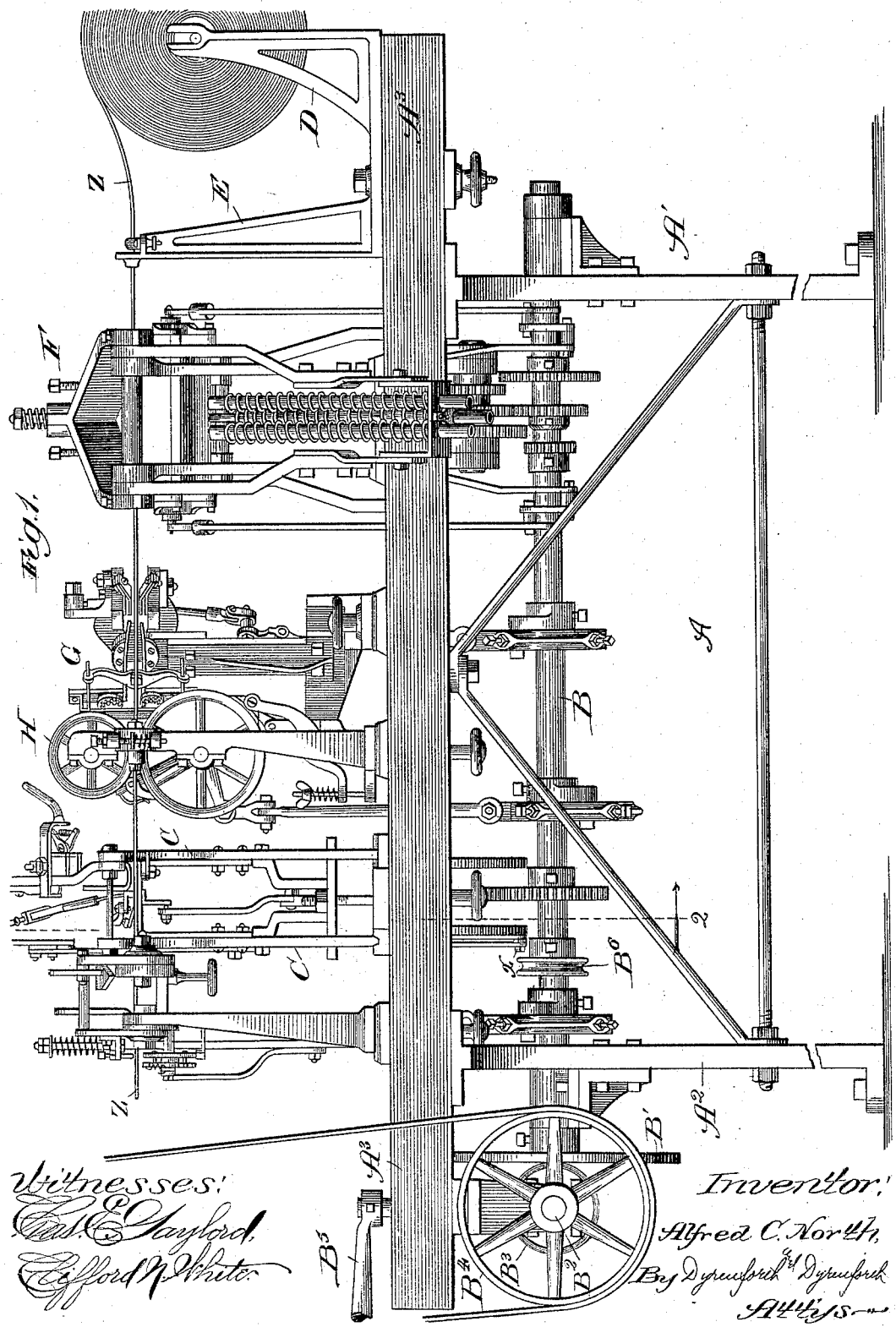

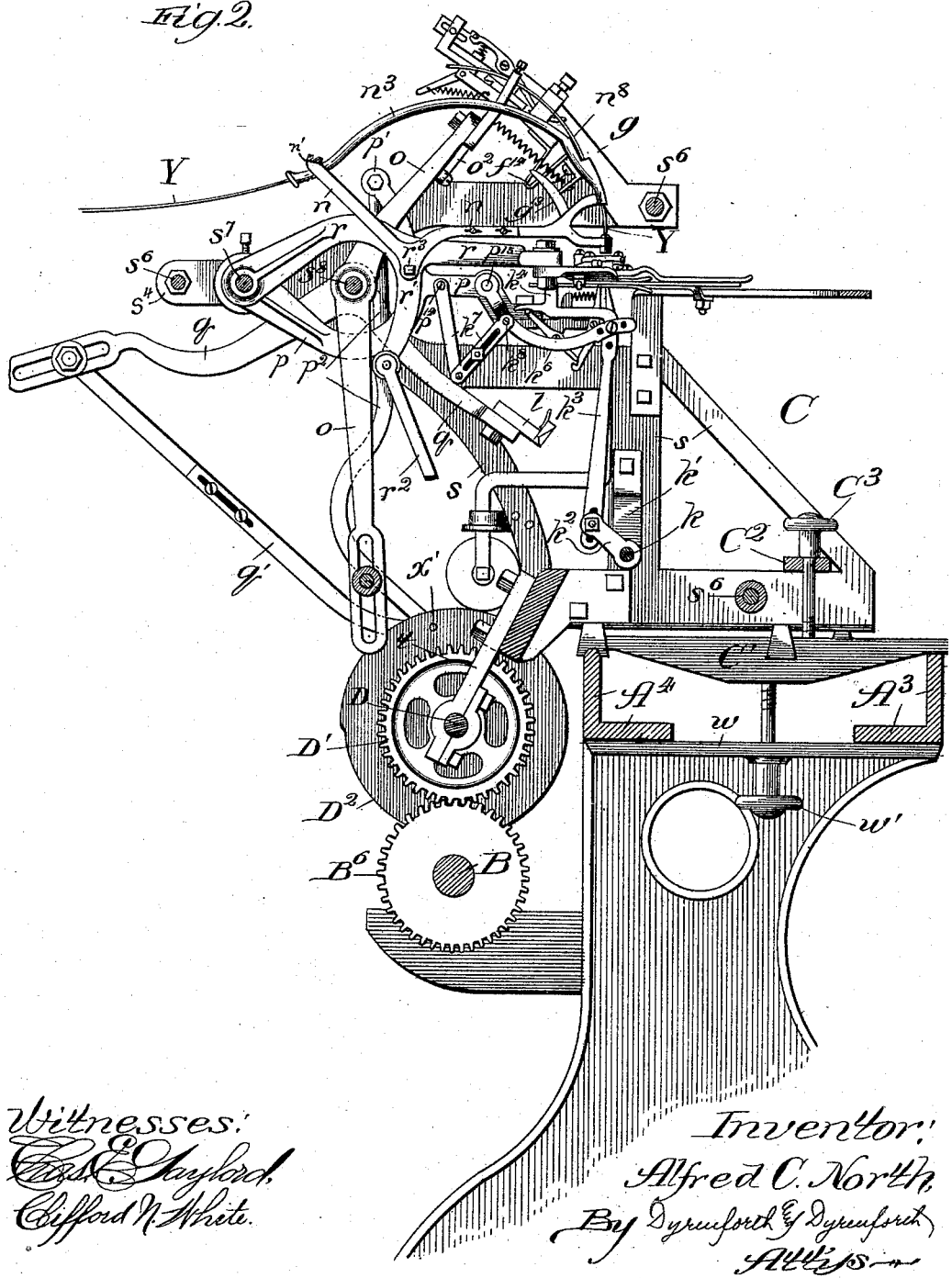

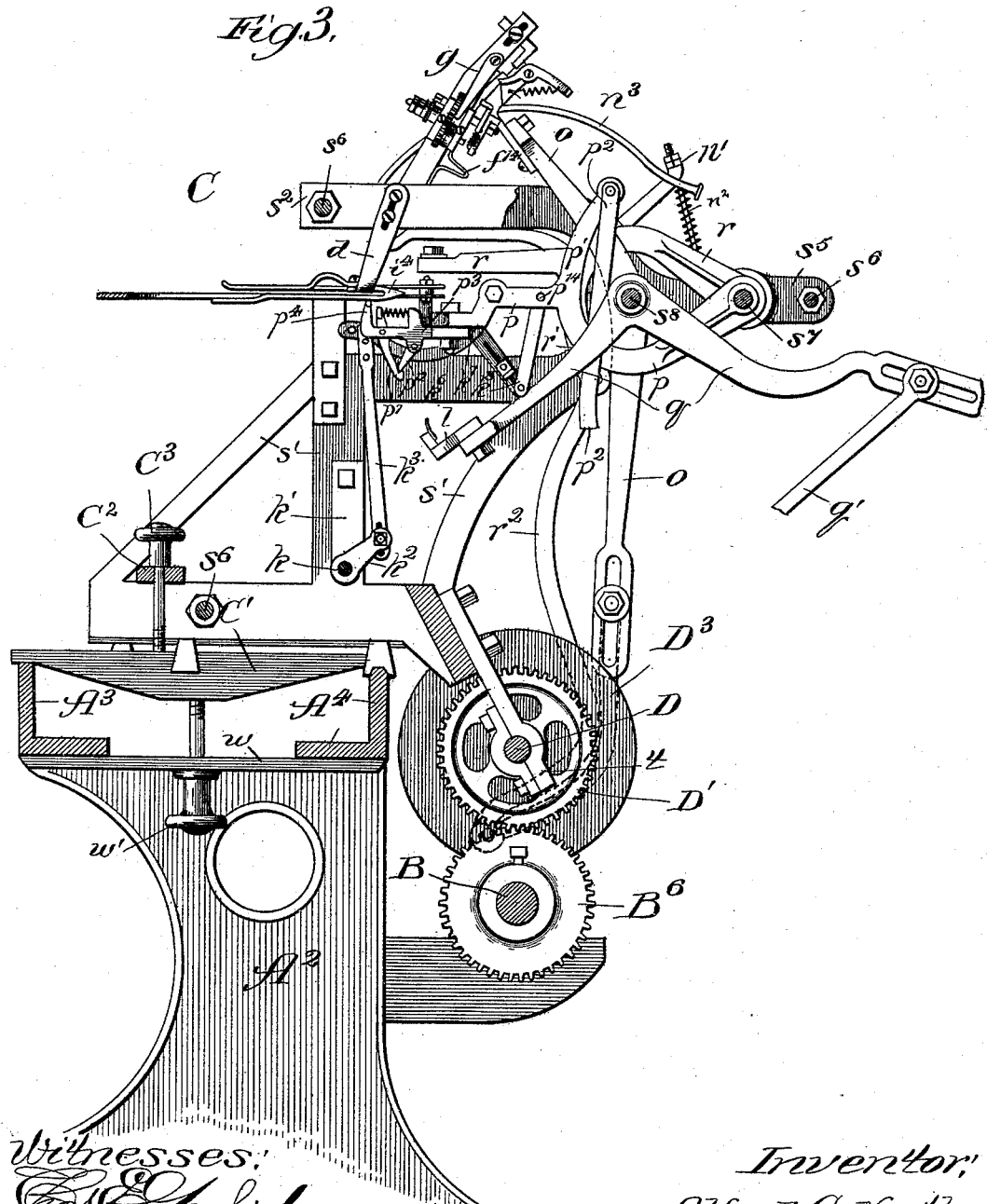

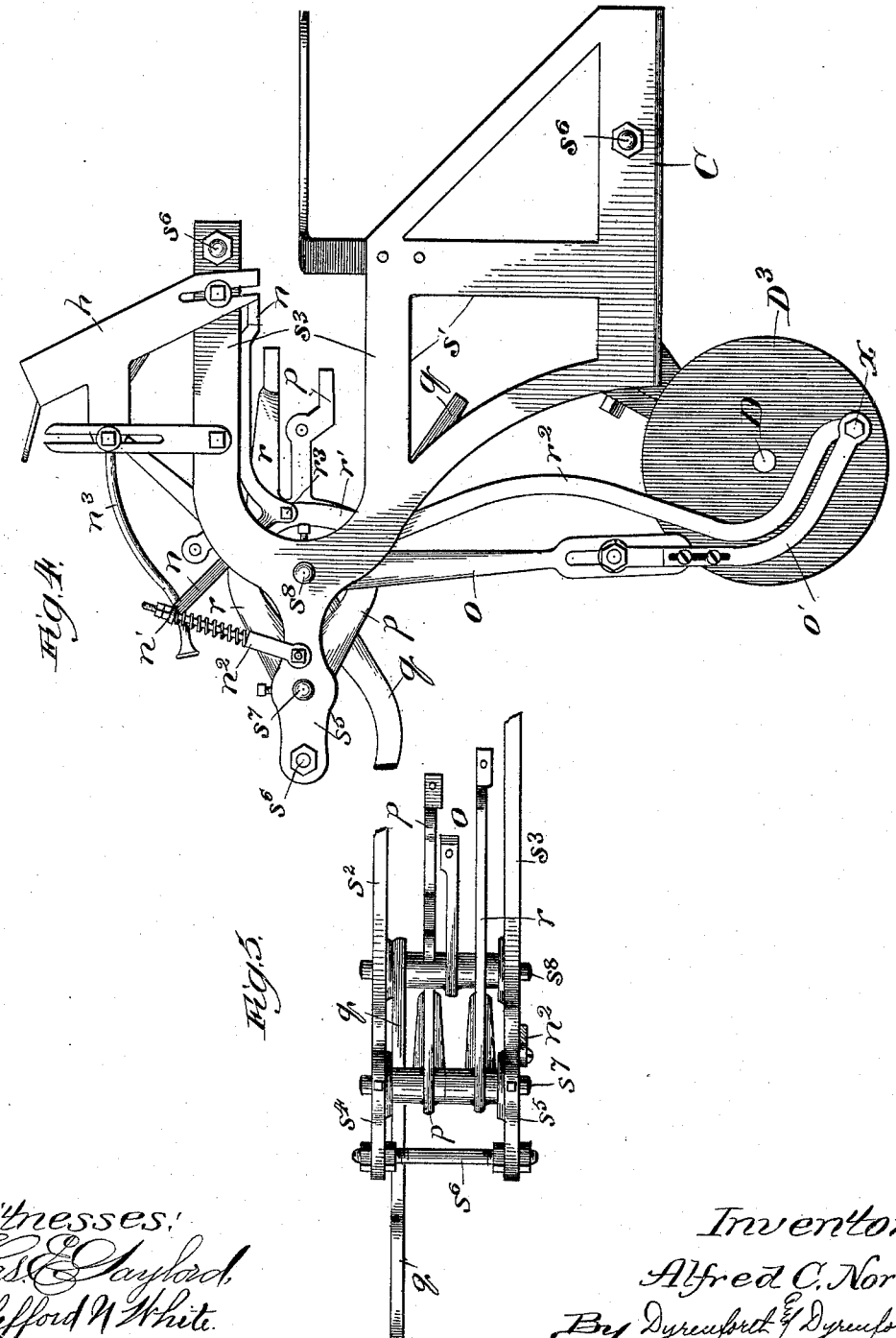

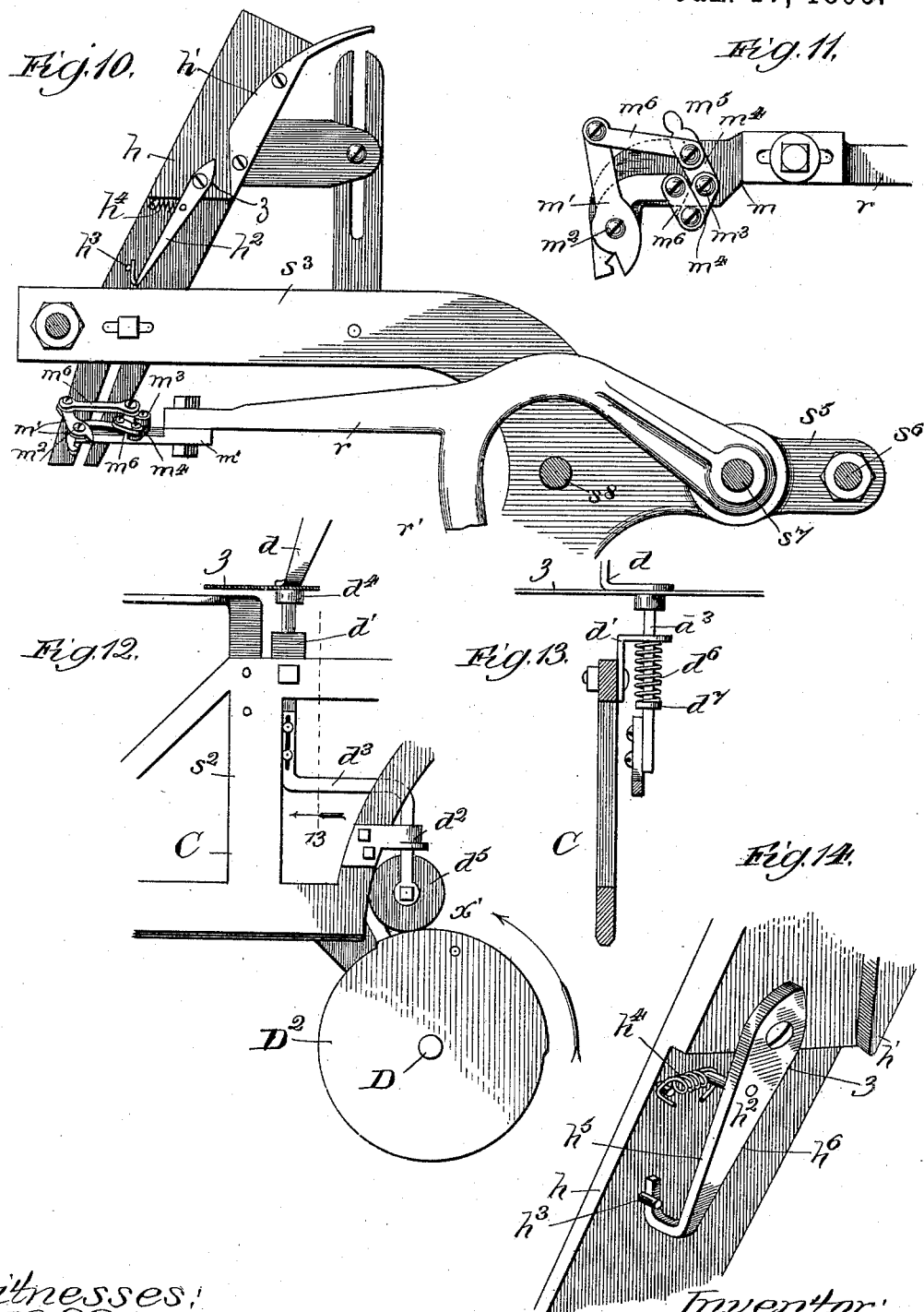

(No Model.) 9 Sheets—Sheet 7.
A. C. NORTH.
STRINGING MACHINE.
No. 489,982. Patented Jan. 17, 1893.
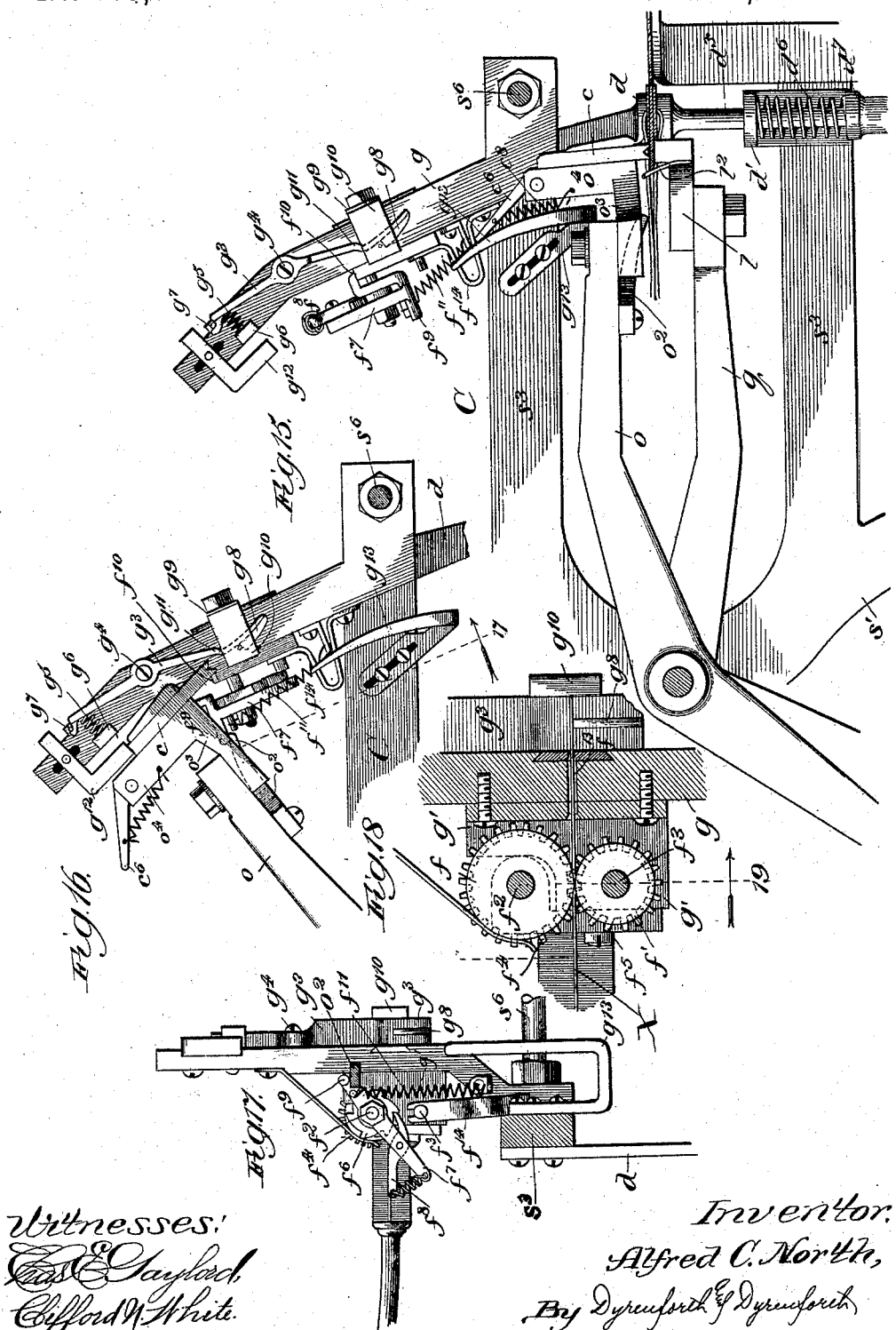

(No Model.) 9 Sheets—Sheet 8.
A. C. NORTH.
STRINGING MACHINE.
No. 489,982. Patented Jan. 17, 1893.
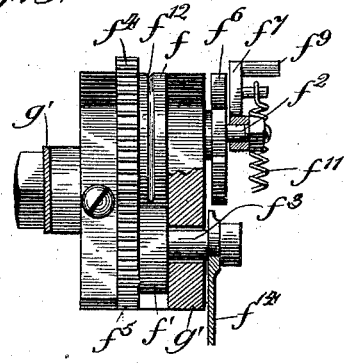
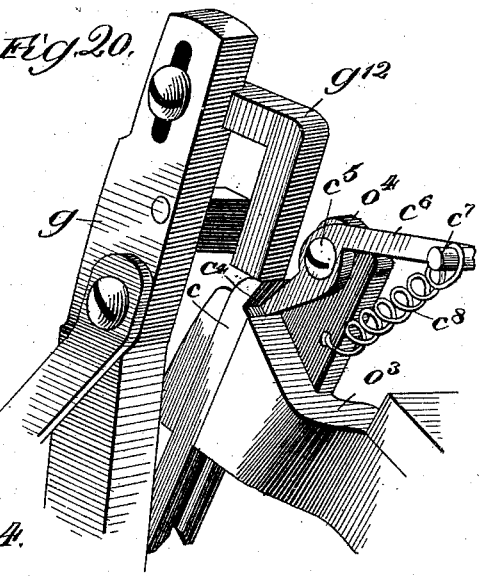
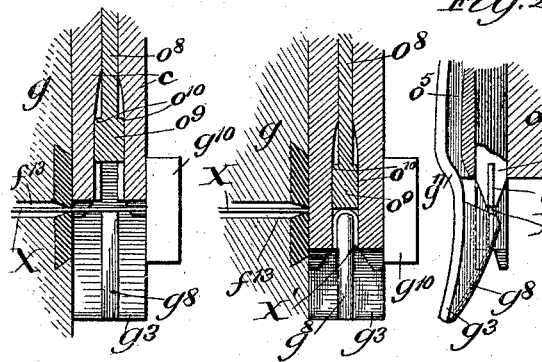
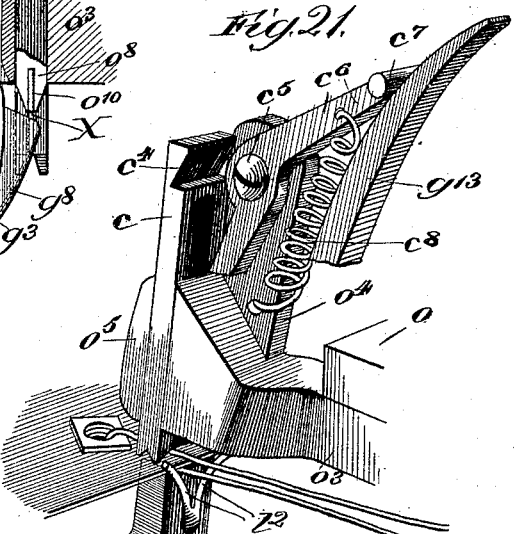
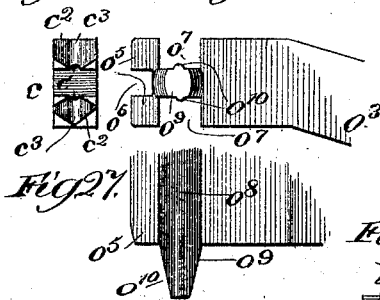
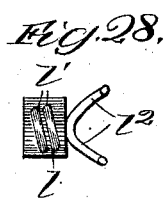
Witnesses:
Chas. E. Gaylord,
Clifford N. White.
Inventor:
Alfred C. North,
By Dyrenforth & Dyrenforth
Attys.

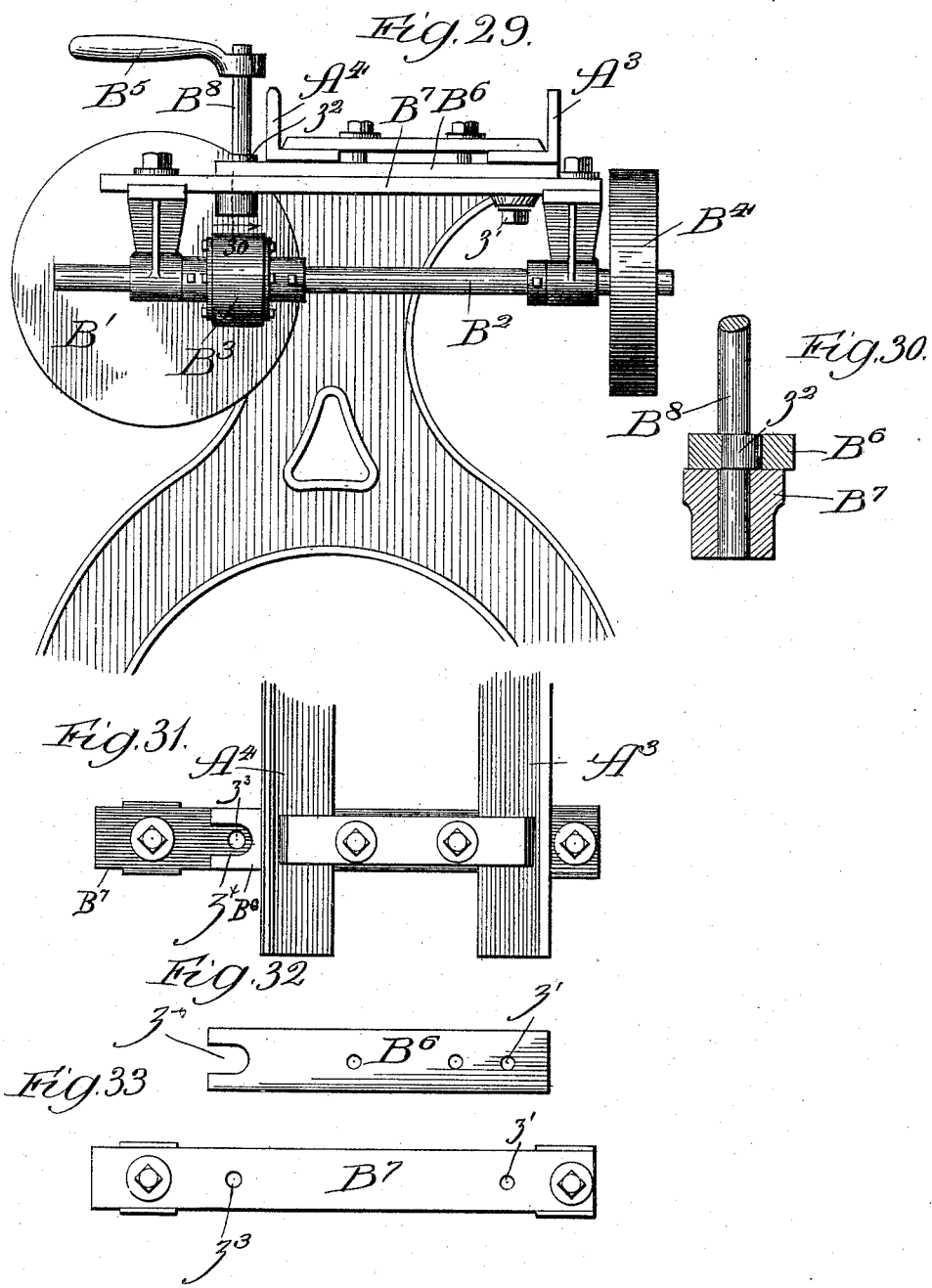

UNITED STATES PATENT OFFICE.

ALFRED C. NORTH, OF BENTON HARBOR, MICHIGAN, ASSIGNOR TO JEROME EDDY, OF FLINT, MICHIGAN, AND ARTHUR J. EDDY, OF CHICAGO, ILLINOIS.

STRINGING-MACHINE.

SPECIFICATION forming part of Letters Patent No. 489,982, dated January 17, 1893.

Application filed June 22, 1891. Serial No. 397,134. (No model.)

*To all whom it may concern:*

Be it known that I, ALFRED C. NORTH, a citizen of the United States, residing at Benton Harbor, in the county of Berrien and State of Michigan, have invented a new and useful Improvement in Stringing-Machines, of which the following is a specification.

My invention relates to improvements in machines for supplying tags with their tying medium, whether of string or wire, for attaching them to the articles to be tagged.

My object is to provide mechanism, for the purpose stated, of generally improved construction which will operate to securely fasten the tying medium upon its tag; further, to provide such mechanism in combination with tag forming mechanism, in a single machine, to co-operate therewith, in forming completed and "strung" tags from a continuous web of the tag material; further to combine the tying medium applying mechanism with a printing press as well as tag-forming mechanism, in a single machine, whereby tags, printed and strung, may be manufactured from a continuous automatically fed web of the tag material, in one machine.

My object is still further to provide mechanism for the above-named stringing purpose, which, whether acting singly or in combination with other mechanism, shall operate to perform its function with great exactness and rapidity.

My invention is particularly, though not necessarily, designed for "stringing" the tags in a manner to produce the article described and claimed in Letters Patent of the United States No. 445,731 granted to me February 3, 1891. In the tag there shown, the tying medium is looped through the eye and secured in place by a staple, which passes through the body portion of the tag between the eye and adjacent end and embraces the tying medium on both sides of the tag.

While my improved stringing mechanism is particularly designed for use in stringing tags, as stated, it may be employed for providing a card or sheet of any description with a tying medium for attaching it to another object.

The drawings illustrate my improved stringing mechanism upon a machine provided with a printing press and "washer"-applying mechanism, both of my improved construction, forming the subjects of separate concurrent applications for Letters-Patent, Serial Nos. 397,132 and 397,133, filed June 22, 1891, and will not be referred to in the present connection any further than may be necessary in describing the co-operation therewith of the stringing mechanism.

Referring to the drawings—Figure 1 is a view in side elevation of a machine for turning out printed tags, reinforced at the eyes with washers, and strung; Fig. 2, an enlarged broken section taken on line 2 of Fig. 1, viewed in the direction of the arrow, and showing the stringing mechanism or "stringer" in sectional side elevation; Fig. 3, a broken sectional view of the opposite side of the same mechanism; Fig. 4, a broken side elevation of the stringer operating levers and other details; Fig. 5, a broken and partly sectional top plan view of the outer end-portion of the stringer; Figs. 6 and 7 enlarged perspective views of details of the stringer mechanism; Figs. 8 and 9, broken and enlarged plan-views of details; Fig. 10, an enlarged broken sectional elevation, partly perspective, of details; Fig. 11, an enlarged broken plan view of some of the details shown in Fig. 10; Fig. 12, a broken and partly sectional view of the lower outside end portion of the stringer; Fig. 13, a section taken on line 13 of Fig. 12; Fig. 14, an enlarged broken perspective view of details of the construction; Fig. 15, an enlarged broken view in elevation, partly sectional, of the forward end portion of the stringer, showing the movable details in one position; Fig. 16, a broken view in elevation of certain of the details of Fig. 15 showing the movable parts in their raised position; Fig. 17, a section taken on line 17 of Fig. 16 and viewed in the direction of the arrow; Fig. 18, an enlarged central sectional elevation of the intermittingly operated staple-wire feed mechanism; Fig. 19, an enlarged section taken on line 19 of Fig. 18 and viewed in the direction of the arrow; Fig. 20, an enlarged broken perspective view of details of the stringer, the movable parts being shown in raised position; Fig. 21, a similar view of movable details illustrating their operation; Fig. 22, a broken sectional view of the staple forming mechanism, showing the wire fed across the path of the movable cutting and bending mechanism; Fig. 23, a similar view of the same mechanism showing a second position of the movable parts and a staple formed therein; Fig. 24, a broken view partly sectional and partly perspective of the same mechanism, the view being taken from another quarter; Fig. 25, a broken bottom plan-view of the staple driving mechanism, which also forms a guide for the staple carrying plunger shown in Fig. 26; Fig. 26, a plan view of the lower end of a plunger which is one of the features of the staple forming mechanism; Fig. 27, a broken view in side elevation of the parts shown in Fig. 25; Fig. 28, a plan view of the removable clinch-block for turning the ends of the staples; Fig. 29, a broken elevation of the rear end of the machine. Fig. 30, an enlarged broken sectional view, the section being taken on line 30 of Fig. 29; and Figs. 31, 32 and 33, plan views of details of the shipping mechanism for starting and stopping the machine.

A is the frame of the machine of which $A'$ and $A^2$ are the supports. The top of the frame is formed with two top rails $A^3$ and $A^4$ which extend parallel with each other longitudinally of the frame. A drive shaft B is mounted in bearings on the supports $A'$ $A^2$ and at its end carries a friction disk $B'$. On the end of the frame A is journaled a power shaft $B^2$, extending at a right angle to the shaft B and carrying, an adjustable friction pulley $B^3$ and a power pulley $B^4$.

$B^6$ is a flat bar extending across the rear end of the machine and projecting at one end beyond the top rail $A^4$. In the end of the bar $B^6$, adjacent to the rail $A^4$, is a recess $z^x$. Resting flat against the underside of bar $B^6$, and pivotally secured thereto at $z'$, is a bar $B^7$, depending from which are hangers in which the shaft $B^2$ is journaled.

$B^8$ is a rotary operating rod provided between its ends with a cam $z^2$ and carrying a handle $B^5$. The lower end-portion of the rod $B^8$ extends into an opening $z^3$ in the bar $B^7$, which opening is just large enough to receive the rod and permit it to turn therein. The cam $z^2$ of the rod rests upon the bar $B^7$ in the recess $z$ of the bar $B^6$. The bar $B^6$ being stationary, turning of the rod $B^8$ causes the cam by bearing against one or the other of the sides of the recess $z$, to swing the bar $B^7$ on the pivot $z'$ and carry the pulley $B^3$ into or out of contact with the disk $B'$. The shaft $B^2$ rotates constantly, therefore, by turning the handle $B^5$, the friction gear (that is to say the pulley $B^3$ and disk $B'$) between the shafts $B^2$ and B, may be thrown into and out of engagement to start or stop the machine. On loosening the set-screws which tighten the pulley $B^3$ on the shaft $B^2$, the former may be adjusted along the shaft, toward or away from the center of rotation of the disk $B'$, and the relative speed of the shaft B thus increased or diminished.

The frame C of the stringer mechanism is mounted upon a sliding support $C'$ which rests at opposite ends on the rails $A^3$ $A^4$. On the underside of the rails is a sliding companion bar $w$ for the support $C'$ connected with the latter by a hand screw $w'$. The bar $w$ slides with the support $C'$ and the two may be caused to clamp the rails between them, by turning the screw $w'$, to hold the support firmly in adjusted position.

The frame C comprises two side-frames $s$ $s'$ corresponding in shape, and formed with horizontally extending U-shaped top portions $s^2$ $s^3$, respectively, having the backward extending parts $s^4$ $s^5$. The sides $s$ $s'$ are held in fixed relation by suitable cross braces, $s^6$, and stationary shafts $s^7$ and $s^8$.

Upon the frame C is a loose cross-bar $C^2$ at which the frame is clamped to the support $C'$ by a screw $C^3$. On loosening the screw the frame C may be slid to a limited extent longitudinally upon the support $C'$, in a direction cross-wise of the main frame A, for purposes of adjustment.

D is a short horizontal shaft, journaled in brackets $t\ t$ on the frame C, and carrying between the brackets a gear-wheel $D'$ which meshes with a gear-wheel $B^6$ on the shaft B. Beyond the brackets $t$ the shaft D, carries at opposite ends, respectively, disks $D^2$ and $D^3$.

Fulcrumed at one end on the shaft $s^7$ is a rocking-lever $r$, having a downward extending branch arm $r'$, pivotally connected by means of a rod or pitman $r^2$ with the disk $D^3$, at $x$. Fulcrumed between its ends upon the shaft $s^8$ is a lever $q$, pivotally connected, at its outer end portion, by means of a rod or pitman $q'$, with the disk $D^2$ at $x'$. A rocking lever $p$, is fulcrumed on the shaft $s^7$, and it has an upward extending branch arm $p'$ at which it is pivotally connected by means of a rod or pitman $p^2$ with the disk $D^2$ at $x'$. Fulcrumed upon the shaft $s^8$ is a bell-crank lever $o$ pivotally connected at the end of its lower arm by means of a link $o'$ with the disk $D^3$ at $x$. The points $x\ x'$ are diametrically opposite each other across the common center of the disks $D^2$ $D^3$, whereby, owing to the natures of their connections with the disks, the free ends of the levers $r$ $q$ will rise as the free ends of the levers $p$ $o$ descend. On the lever $r$ and pivoted thereto, between its ends, at $r^3$, is a rocking frame or lever $n$, which at its end $n'$ is provided with an opening at which it is pivotally connected by means of an oscillating pin $n^2$ with the extension $s^5$ of the frame C. The pin $n^2$ passes loosely through the opening in the end $n'$ of the lever $n$, and beyond the lever it is provided with a nut against which the said end $n'$ is normally pressed by a spring confined upon the pin, as shown. The lever $n$ carries a tubular guide $n^3$ for the string (or wire) Y, and secured to its free end is a laterally extending block $n^4$ (see Fig. 6) having an eye $n^5$ through it for the passage of the string. Extending from the block $n^4$ at opposite sides of the eye $n^5$ are two narrow strips $n^6$ of springy metal, which, at their free ends, form blunt points, clamping the string between them, and they operate as a needle to guide the end of the string through the eye of the tag to be strung, as hereinafter described. In the upper side of the tube $n^3$ is an opening $n^7$ into which a spring $n^8$, mounted on the tube, extends to bear against the string and operate as a clutch to prevent the string from being drawn in the reverse direction from any cause. On the free end of the lever $r$ is a block $m$ (see Fig. 10) carrying a pair of laterally projecting snips $m'$, pivoted together and to the block $m$ at $m^2$. On the block $m$, pivoted thereto at $m^3$, is a lever $m^4$, which extends at its end $m^5$ (see Fig. 11) beyond the side of the block. The arms of the snips are pivotally connected, respectively, with the lever $m^4$ at opposite sides of the pivot of the latter, by links $m^6 m^6$. The jaws of the snips are opened and closed by operating the lever $m^4$ from its end $m^5$.

On the free end of the lever $p$ is a block or arm $p^3$ (see Fig. 7) provided at its end with a finger $p^4$ which is rigid upon the block and affords one jaw of a string gripping mechanism; and, also upon the block $p^3$, is a projection $p^5$ extending parallel with the finger $p^4$. Fulcrumed between its ends upon the block at $p^6$, is a lever $p^7$ one arm of which extends at the side of the arm $p^4$, to afford the second jaw of the said gripping mechanism, and it is pressed, normally against the first named jaw, by a spring $p^8$. confined between it and the projection $p^5$. The opposite arm of the lever $p^7$ is formed with a cam face $p^9$ terminating, near the end of the arm, in a notch $p^{10}$. Pivoted at $p^{11}$ upon the block $p^3$ is a lever $p^{12}$ extending at one end against the face $p^9$ of the lever $p^7$ and provided at its opposite end with a laterally projecting pin $p^{13}$. Movement of the lever $p^{12}$, on its pivot $p^{11}$, in one direction, causes its end to slide along the face $p^9$ of the lever $p^7$, until it enters the notch $p^{10}$, and swing the opposite end of the lever $p^7$, against the resistance of the spring $p^8$, away from the finger $p^4$ and thus open the jaws of the gripper. The jaws are held open until the lever $p^{12}$ is released from the notch $p^{10}$ when the jaws close by the action of the spring $p^8$.

In the lower part of the frame C is a horizontal shaft $k$ (Figs. 2 and 3) having its bearings in brackets $k'$ on the sides $s s'$. Pivoted upon the shaft $k$ is a link $k^2$ pivotally connected at its free end with the lower end of a rod $k^3$, which at its upper end is bent to the form shown in Fig. 7 to afford a bearing $k^4$ for two forward projecting slotted string-clamping and tensioning strips $i i'$. The tension strips $i i'$ are adjustably secured to the bearings $k^4$ by a nut-bolt $i^2$ and are provided on adjacent edges with angular laterally-extending guide projections $i^3$, (see Fig. 6.) On the rod $k^3$, near its end-portion $k^4$, is a finger or stop-projection $k^5$ which extends across the path of the pin $p^{13}$ on the lever $p^{12}$, to strike the latter in the upward forward movement of the parts as hereinafter described. The rod $k^3$ is pivotally connected to the lever $p$, at $p^{15}$, by a link $k^6$; and $k^7$ is a toggle-lever pivoted, at the end of one arm to the lever $p$, at $p^{14}$, (see Fig. 2) and, at the end of its other arm, to the link $k^6$, at $k^8$. The toggle-lever $k^7$ carries a laterally projecting stop $k^9$ (see Fig. 7) for the pin $p^{13}$ on the lever $p^{12}$ to strike against in the downward backward movement of the parts.

The mechanisms carried by the levers $r p$ and the rod $k^3$ operate to insert and draw the string through the eye of the tag, until the proper lengths of the string extend from opposite sides of the eye; sever the string from the supply, and position the string by drawing the lengths out parallel with each other and in line with the tag so that they may be fastened together by the stapling mechanism to be hereinafter described.

The web Z of tag material is caused by the intermittent feed-mechanism, H, to travel and stop when an eye, already formed in the web and reinforced by washers, arrives in position; and the operation of the string applying mechanism, thus far described, is as follows: As the lever $r$ swings downward the lever $n$ swings with it and, owing to its link connection, $n^2$, with the frame C, rocks forward on its pivot $r^3$, causing its forward end carrying the needle $n^6$ to move more rapidly than the adjacent end of the lever $r$ which carries the snips $m'$. The jaws of the snips are open and the end of the needle passes between them, as shown in Fig. 6. While the lever $r$ is descending, as described, the lever $p$ swings upward, causing the rod $k^3$ to be rocked forward on its pivot, $k$, and reciprocate the tension clamps $i i'$ into the forward position shown in Figs. 6 and 7. The clamps $i i'$ are of springy metal, and bear normally against each other. On the frame C is a stationary horizontal, backward-extending and pointed guide-finger or spreader $i^4$, across the opposite sides of which the projections $i^3$ of the clamps $i i'$ pass, and which operates to spread the clamps apart, as they near their forward positions, whereby they pass respectively across the upper and lower surfaces of the web Z. When the needle descends it passes a limited distance through the eye in the web, and the slots in the clamps $i i'$. The upward swing of the lever $p$ carries the gripping mechanism upward with the jaws $p^4 p^7$ open, and the latter rise on opposite sides of the downward projecting end of the string Y. As the lever $p$ nears the limit of its rise, the pin $p^{13}$ on the lever $p^{12}$ strikes the stop-projection $k^5$, on the rod $k^4$, and turns the opposite end of the lever $p^{12}$ out of engagement with the notch $p^{10}$ in the lever $p^7$, whereby the spring $p^8$ drives the latter at its upper end against the finger $p^4$ and they thus clamp the end of the string tightly between them. In the rise of the lever $r$ and simultaneous descent of the lever $p$, the string pays out through the tube $n^3$ and is drawn through the eye in the web Z, the needle and grippers moving at about equal speed. As the lever $n$ is moved more rapidly than the lever $r$, the needle rises from between the snips $m'$.

At the top of the side $s^3$ of the frame C is an upward extending plate $h$, (see Figs. 10 and 14,) provided on its face with a cam $h'$ and a pivotal cam faced switch $h^2$, both in the positions shown and in the path of the projecting end portion $m^5$ of the snips-operating lever $m^4$. The switch is held yieldingly against a stop $h^3$ on the plate $h$, by a spring $h^4$. In the descent of the lever $r$ the snips are open and the projection $m^5$ passes across the side $h^5$ of the switch, the latter yielding against the resistance of its spring. In the rise of the lever $r$ the projection $m^5$ slides upon the side $h^6$ of the switch causing the lever $m^4$ to be turned to close the jaws of the snips and sever the string. The string is severed when the projection $m^5$ reaches the point $z$ on the switch, by which time the lower end of the needle is, in practice, say an eighth of an inch above the snips, so that when the string has been cut the end of the string supply projects that distance beyond the needle. When the projection $m^5$ strikes the cam $h'$ the lever $m^4$ is swung in the direction to open the snips. At the same instant that the snips sever the string, the pin $p^{13}$ on the lever $p^{12}$ meets the stop $k^9$ on the toggle-lever $k^7$, which causes the opposite end of the lever $p^{12}$ to slide down the side $p^9$ of the lever $p^7$ to the notch $p^{10}$, to open the grippers and release the string. The downward movement of the lever $p$ swings the rod $k^3$ backward, and just as the snips sever and the grippers release the string, the forward ends of the slots in the clamps $i\ i'$ pass the eye in the web and engage the lengths of string. At the same time, the projections $i^3$ leave the guide-finger $i^4$ and spring together clamping both lengths of the string gently between them, and sliding along the lengths, they cause the latter to extend taut across the intervening part of the web Z, which afterward forms the top portion of the tag.

To prevent the clamps $i\ i'$ as they pull upon the string from drawing with it the web Z and thus displacing the latter, I provide the following web-clamping mechanism: Extending downward from the upper part of the side $s^2$ of the frame C is a foot $d$ the lower end of which is flattened and extends close to the upper surface of the web. Reciprocating vertically in guides $d'\ d^2$, (see Fig. 12,) on the frame C, is a rod $d^3$, bent to the shape shown, provided at its upper end with a head $d^4$, and at its lower end with a roller $d^5$, which rests upon the circumferential face of the rotating disk $D^2$. The arc of the periphery of the disk $D^2$ is enlarged, as shown, throughout part of the circumference to afford a cam, which, in operation, is timed, with each rotation of the disk, to raise the rod $d^3$ against the foot $d$, while the string is being drawn, and to permit the rod to drop out of engagement with the foot when the web is caused by its feed mechanism to travel. In order that the rod may drop quickly when the pressure exerted against it by the cam $D^2$ is relaxed, I provide a spring $d^6$ on the rod which is confined between the guide $d'$ and a collar $d^7$ on the rod, as shown, and operates to press the rod in the direction of the cam.

The lever $q$ carries on its free end an angular block $l$ provided in its end with shallow sockets $l'\ l'$ (see Fig. 28) which deepen gradually from end to center and operate as hereinafter described, to clinch the ends of the staples. Projecting from the rear side and beyond the end of the block $l$ is a V-shaped guide $l^2$, for the lengths of the string, as the latter are drawn taut by the tension clamps $i\ i'$.

As before stated, the strings which extend about midway of their lengths, through the eyes of the tags are secured in place by staples passing through the tags between the eyes and adjacent ends of the latter and around the opposite lengths of the string to clamp them together against the opposite sides of the tags. The staples are formed in the machine, as required, from a continuous length of wire, which is fed automatically to the machine, and the staples are so driven as to straddle the strings and become clinched around the latter on the reverse side of the tag.

Following is a description of the staple forming and driving mechanism: On the side $s^3$ of the frame C is an arm $g$, carrying brackets $g'$ between which are mounted two rotary feed rollers $f\ f'$ on shafts $f^2\ f^3$, respectively, which have their bearings in the brackets. The shafts $f^2\ f^3$ carry gear wheels $f^4\ f^5$ respectively, which mesh with each other; and, on the shaft $f^2$ are a ratchet-wheel $f^6$ and a loosely mounted lever $f^7$ carrying a spring-pawl $f^8$ which engages the ratchet-wheel. On the free end of the lever $f^7$ is a laterally extending pin $f^9$, which projects into the path of a finger $o^2$ on the lever $o$, the said finger, in its rise, operating to strike the pin, and turn the lever $f^7$, as hereinafter described. The lever $f^7$ is held normally against a stop $f^{10}$ on the arm $g$, by a spring $f^{11}$, and upward movement, against the resistance of the spring $f^{11}$, of that end of the lever $f^7$, which carries the pin $f^9$, causes the pawl $f^8$ to turn the ratchet and rotate the rollers $f\ f'$. The roller $f$ is provided with a circumferential groove $f^{12}$ (see Fig. 19) and in horizontal line with the said groove, at the point of contact, or nearest approach, of the rollers, is a guide opening $f^{13}$, through the arm $g$, for the staple wire X. One end of the shaft $f^3$, carrying the roller $f'$, extends beyond the side of the bracket $g'$ and rests in a socket in the end of a spring $f^{14}$, which tends normally to press the roller $f'$ yieldingly against the roller $f$. On the side of the arm $g$ opposite the bracket $g'$ is a lever $g^3$, pivoted to the arm $g$ at $g^4$, and held normally in the position shown by a spring $g^5$ which is confined between a lug $g^6$ on the arm $g$ and the upper end of the lever. The spring $g^5$ presses the upper end of the lever $g^3$ against a stop $g^7$ projecting from the arm $g$. At its lower end the lever $g^3$ carries a tongue $g^8$ the upper edge of which affords the male die-portion of the staple forming mechanism, and extends normally in a plane just below the guide opening $f^{13}$. Above the tongue $g^8$ the lever $g^3$ is bent to provide a shoulder $g^{11}$. Secured upon the arm $g$ is a bracket $g^9$ having an arm or plate $g^{10}$ which extends parallel with the adjacent surface of the arm at a distance from the latter equal to the length of the blank or section of wire which it is desired to employ in forming a staple. The lower end portion of the lever $g^3$, carrying the tongue $g^8$, extends midway between the plate $g^{10}$ and arm $g$. On the end of the lever $o$ is a block $o^3$, having an upward extending arm $o^4$, (see Fig. 21) which is flush with one side of the block and about half the thickness of the latter. On the outer face of the block $o^3$ is a longitudinal groove $o^6$ (see Fig. 25) and at opposite sides of the block near its end are coincident grooves $o^7$, which produce in the block the narrow guide neck $o^8$ and head $o^5$. The neck portion $o^8$ terminates at its lower end in an extension $o^9$ provided on opposite sides with longitudinal guide ridges $o^{10}$, for a reciprocating bifurcated block $c$. The forks of the blocks $c$ slide upon opposite sides of the neck $o^8$ and extension $o^9$, and are provided on their inner faces with grooves $c'$ (see Fig. 26) which fit over the guides $o^{10}$. The ends of the forks are provided with coincident V-shaped notches $c^2$ terminating in grooves $c^3$. On the rear side of the block $c$ near its upper end above the forks is a notch $c^4$. Pivoted upon the arm $o^4$, at $c^5$, is a lever $c^6$ shaped at one end to enter and engage the notch $c^4$ in the block $c$ and provided at its opposite end with a laterally extending pin $c^7$. A spring $c^8$ connected at opposite ends, respectively, with the arm $o^4$ and lever $c^6$, tends normally to swing the lower or notch engaging end forward. On the arm $g$ is a stop $g^{12}$ in the path of the upper end of the block $c$; and, on the frame C is a cam-faced finger $g^{13}$, which extends across the path of the pin $c^7$, on the lever $c^6$, to swing the latter on its pivot in the downward movement of the lever $o$.

In operation, as the lever $o$ nears the upper limit of its rise, the stop projection $o^2$ carried by the said lever, strikes the pin $f^9$ on the lever $f^7$, and, in its further movement, swings the latter upward, causing the pawl $f^8$ to engage and turn the ratchet-wheel $f^6$. The turning of the ratchet-wheel rotates the feed-rollers $f f'$ in the direction to advance the staple-wire X, through the guide opening $f^{13}$, until its end strikes the surface of the plate $g^{10}$. At the same time the block $c$ strikes the stop $g^{12}$, and is reciprocated downward on its guide $o^8$, until engaged at its notch $c^4$ by the lever $c^6$. In the downward movement of the lever $o$, the lower end of the block $c$, at its groove $c^3$, engages the wire X and severs it at the opening $f^{13}$. The further downward movement of the block bends the blank, severed from the wire, across the tongue $g^8$, to form the staple X' which, at its sides, extends in the grooves $c'$ of the block $c$ and is engaged at the top by the lower end of the projection $o^9$. At the moment that the staple is formed the head $o^5$, which is rounded as shown at its lower end, strikes the shoulder $g^{11}$ of the lever $g^3$ and swings the latter, against the resistance of the spring $g^5$, to move the tongue $g^8$ from under the staple. In the further descent of the lever $o$, the pin $c^7$ on the lever $c^6$ slides along the cam finger $g^{13}$, which turns the lever $c^6$, against the resistance of the spring $c^8$, out of engagement with the notch $c^4$ of the block $c$, whereby the latter is free to slide on its guide $o^8$. When the lower end of the block $c$ reaches the surface of the web Z, it stops, while the continued movement of the lever $o$ causes the block $o^3$ to slide in the block $c$, and the staple to be driven, by the projection $o^9$, through the tag. In the meantime the lever $q$ has swung upward carrying its block $l$ to the under surface of the web and the V-shaped guide $l^2$ across opposite sides of the string to insure the position of the latter. Thus the staple as it is driven through the web Z straddles the opposite lengths of the string, and impinging against the block $l$ in the sockets $l'$, its ends are bent over toward each other and across the under length of the string.

It will be seen from the drawings that the various parts comprising the stringing mechanism, independently of the stapling mechanism, are respectively secured to the stationary frame and the levers $r$ $p$, in a manner to permit of their being adjusted to a limited extent toward or away from the vertical plane of operation of the parts comprising the stapling mechanism. As shown in the drawings the adjustments described are rendered possible by having the blocks or arms carrying the gripping mechanism and snips, bolted to their operating levers through elongated slots in the latter, the needle carrying frame formed in extensible sections (see Fig. 2), and the cam-carrying plate $h$, secured by a bolt extending through an elongated slot in the part $s^3$ of the frame (see Fig. 10). By adjusting the parts named the staple when driven may be caused to engage the string at any desired distance from the eye of the tag.

The operations of the various parts of the mechanism described are timed by the movements of the levers, and they act with equal precision, whether the tying medium they provide is string or wire.

The term "string" as used throughout this specification is generic and includes any other desirable flexible material, such as wire.

When my improved stringer forms one feature of a tag making machine, or tag making and printing machine, as shown in Fig. 1, the preferred arrangement of parts is that illustrated.

The web Z is unwound from a roll, which may be mounted between standards D at the forward end of the machine, passes through a suitable guide E; thence between the bed and platen of a printing-press F, which prints upon the web at the desired locations; thence to the washer applying and eye forming mechanism, G. Thence between the feed rollers of the web feeding mechanism, H; thence to the stringer described; and lastly to the cutting mechanism which bevels the corners and severs the tags from the web. The feed mechanism H is of a construction which renders it capable of being adjusted with great exactness to regulate the speed of travel of the web; and the various mechanisms may be adjusted toward and from each other upon the frame A to meet the requirements for turning out tags of any desired size.

While the construction of the stringer, shown and described is the one I prefer to employ it will be obvious that it may be modified in various particulars without departing from the spirit of my invention. I do not therefore confine myself to the details of construction described and shown; nor, to the use of my device upon a machine, for manufacturing blank or printed tags. My improved device may be employed to fasten the lengths of the tying medium together, as described, beyond the edge of the tag, instead of between the eye and adjacent edge thereof; and I do not confine my invention to the manufacture of any particular kind of tag.

What I claim as new and desire to secure by Letters Patent is—

1. In a stringing machine the combination of a string feeder and threader, fastener applying mechanism and string engaging means for holding the string in position while the fastener is being applied, all arranged to operate substantially as described, said mechanism being connected with and operated from the driving power of the machine, substantially as set forth.

2. In a stringing machine, the combination of a feed for the string, operating to pass it through the article to be supplied with the string, catch mechanism for the string, operating to draw it through the said article, and fastener applying mechanism for applying fasteners to the string to secure it in place on the article, and string engaging means for holding the string in position while the fastener is being applied, all actuated from the driving power of the machine to co-operate, substantially as described.

3. In a stringing machine, the combination of a feed for the string, operating to pass it through the article to be supplied with the string, catch-mechanism for the string, operating to draw it through the article, staple forming and driving mechanism for clasping the strings, and string engaging means for holding the strings in position while the staples are being applied thereto, all actuated from the driving power of the machine to co-operate, substantially as described.

4. In a machine for manufacturing strung sheets from a continuous web, the combination with the frame of the machine, and the driving power, of an intermittent feed for the web, sheet forming mechanism, and mechanism for applying strings to the sheets, and for positioning the strings and applying fasteners thereto, all mounted on the frame and actuated from the driving power of the machine to co-operate, substantially as described.

5. In a machine for manufacturing printed and strung sheets from a continuous web, the combination with the frame of the machine and the driving power, of an intermittent feed for the web, a printing press operative to print on the web, sheet forming mechanism, and mechanism for applying strings to the sheet, and for positioning the strings and applying fasteners thereto, all mounted on the frame and actuated from the driving power of the machine to co-operate, substantially as described.

6. In a machine for manufacturing strung tags from a continuous web, the combination with the main frame, the driving shaft, and intermittingly operating web-feeding mechanism, of a washer applying an eye forming mechanism, mechanism for applying strings to the tags, for positioning the strings and applying fasteners thereto, and corner cutting and tag severing mechanisms, all actuated from the said driving shaft to co-operate, substantially as described.

7. In a machine for manufacturing strung tags from a continuous web, the combination with the main frame, the driving shaft, and intermittingly operating web-feeding mechanism, of a washer applying and eye forming mechanism, a corner cutting and tag severing mechanism, and a mechanism for applying strings to the tags, positioning the strings, and applying fasteners thereto, each mounted on a separate movable support whereby it may be independently adjusted along the main-frame, and all actuated from the said driving shaft, to co-operate, substantially as described.

8. In a stringing machine, the combination with the frame and drive-shaft, of a feed for the string operating to pass the string through the article to be strung, grippers for the string, operating to draw the string through the said article, a cutter operating to sever the required length of string from the string-supply, string positioning mechanism and staple forming, driving and clinching mechanisms, for fastening the string in place on the said article, all actuated from the said drive-shaft to co-operate, substantially as described.

9. In a stringing-machine the combination with the reciprocating needle, of a guide-tube and a clamp $n^8$ for the string movable with the needle, and reciprocating grippers for drawing the string through the guide tube, substantially as and for the purpose set forth.

10. In a stringing machine the combination of the needle and guide for the string, the cutter for severing the string from the string supply, the intermittingly operating string gripping and releasing clamp, and the tensioning clamps for engaging the opposite lengths of the string, each mounted on a separate oscillating lever, as set forth.

11. In a stringing-machine, the combination with the string feeder and threader, mechanism for positioning the strings, of an intermittingly operated staple wire feed, and staple forming, driving and clinching mechanisms, all actuated from the driving power of the machine to co-operate, substantially as described.

12. In a stringing machine, the combination with the stationary frame string feeder and threader, and fastener-applying mechanism, of an oscillating lever $k^4$, carrying spring-clamps $i$ $i'$ provided with guide projections $i^3$, and the clamp-spreader $i^4$ on the frame in the path of the projections $i^3$, as set forth.

13. In a machine for manufacturing strung sheets from a continuous web, the combination with the frame of the machine the driving power, intermittent feed for the web, and web cutting mechanism, of string applying and securing mechanism mounted on the main frame and adjustable thereon in a direction cross-wise of the frame, substantially as described.

14. In a stringing machine, the combination of the string threading mechanism and fastener applying mechanism, adjustable with relation to each other, and string engaging means for positioning the strings while the fasteners are being applied, substantially as and for the purpose set forth.

ALFRED C. NORTH.

In presence of—
J. W. DYRENFORTH,
M. J. FROST.